US012755615B2

(12) United States Patent
Fulton et al.

(10) Patent No.: US 12,755,615 B2
(45) Date of Patent: Oct. 6, 2026

(54) SYSTEM AND METHOD FOR CASHLESS REDEMPTION OF LOTTERY TICKETS AND INCENTIVES FOR PLAYERS TO SPEND LOTTERY WINNINGS AT SPECIFIED THIRD-PARTY RETAIL VENDORS

(71) Applicant: Scientific Games, LLC, Alpharetta, GA (US)

(72) Inventors: Joseph Corry Fulton, Cumming, GA (US); Aaron Kelly Waldron, Boca Raton, FL (US); O'ryan Anderson, Cumming, GA (US)

(73) Assignee: Scientific Games, LLC, Alpharetta, GA (US)

( * ) Notice: Subject to any disclaimer, the term of this patent is extended or adjusted under 35 U.S.C. 154(b) by 155 days.

(21) Appl. No.: 18/917,061

(22) Filed: Oct. 16, 2024

(65) Prior Publication Data

US 2026/0105815 A1 Apr. 16, 2026

(51) Int. Cl.
*G07F 17/00* (2006.01)
*G07F 17/32* (2006.01)

(52) U.S. Cl.
CPC .................................. *G07F 17/329* (2013.01)

(58) Field of Classification Search
None
See application file for complete search history.

(56) References Cited

U.S. PATENT DOCUMENTS 9,711,004 B1 7/2017 Ellis
10,217,319 B2 2/2019 Gagner et al.
10,366,564 B1 * 7/2019 Wentker .............. H04W 12/108
10,916,090 B2 * 2/2021 Miri .................... G07F 17/3211
11,042,870 B2 * 6/2021 Campos ................ G06Q 20/36
11,080,969 B2 * 8/2021 Martineck, Sr. .... G07F 17/3227
11,475,436 B2 * 10/2022 Vaish ..................... G06Q 20/36
2003/0171145 A1 * 9/2003 Rowe ..................... G06Q 20/02 463/25
2004/0108653 A1 * 6/2004 Such ....................... G09F 23/10 283/903
2006/0119033 A1 * 6/2006 Davis ...................... G09F 23/14 273/139
2007/0093299 A1 4/2007 Bergeron et al.
(Continued)

FOREIGN PATENT DOCUMENTS

CN 108 320 001 A 7/2018
OA 20208 A * 3/2022

OTHER PUBLICATIONS

EP Search Report, Jan. 27, 2026.

*Primary Examiner* — Paul A D'Agostino
(74) *Attorney, Agent, or Firm* — Dority & Manning, P.A.

(57) ABSTRACT

A system and method enable redemption of lottery tickets by players in a lottery game wherein the players are encouraged to visit and spend winnings at a third-party vendor establishment. The lottery tickets have indicia thereon that identifies one of a vendors. The players are issued a virtual debit card for winning tickets loaded with a value equal to the cash prize of the ticket. Instructions are provided to the player to visit and spend the cash prize loaded on the virtual debit card at the third-party vendor establishment. An incentive is provided to the player having a value proportional to an amount charged against the virtual debit card at the third-party vendor establishment.

16 Claims, 9 Drawing Sheets

(56) References Cited

U.S. PATENT DOCUMENTS

| | | | | |
|---|---|---|---|---|
| 2008/0026810 | A1* | 1/2008 | Walker | G07F 17/3269 463/17 |
| 2009/0287580 | A1* | 11/2009 | Irwin, Jr. | A63F 3/0665 705/400 |
| 2010/0181755 | A1* | 7/2010 | Irwin, Jr. | G06Q 20/28 283/100 |
| 2013/0304642 | A1* | 11/2013 | Campos | G06Q 20/36 705/41 |
| 2014/0141861 | A1* | 5/2014 | Szendel | A63F 13/70 463/22 |
| 2014/0378203 | A1* | 12/2014 | Board | G07F 17/3237 463/17 |
| 2017/0228965 | A1* | 8/2017 | Irwin, Jr. | G06K 19/06037 |
| 2019/0073651 | A1* | 3/2019 | Simms | G06Q 20/36 |
| 2020/0372533 | A1* | 11/2020 | Rammal | G06Q 30/0238 |
| 2022/0351572 | A1* | 11/2022 | Katz | G07F 17/3211 |
| 2022/0375298 | A1* | 11/2022 | Schertzer | G07F 17/3227 |
| 2024/0096173 | A1* | 3/2024 | Baerlocher | G07F 17/3211 |
| 2024/0169796 | A1* | 5/2024 | Shepherd | G07F 17/3244 |

* cited by examiner

58

26

28

| Tier | Prize Amount | Odds of Winning | Total Prizes |
|---|---|---|---|
| Top tier | $1,000,000 | 1-in-2,297,143 | 14 |
| 2nd | $10,000.00 | 1-in-120,000 | 267 |
| 3rd | $2,000.00 | 1-in-20,000 | 1601 |
| 4th | $1,000.00 | 1-in-12,000 | 2686 |
| 5th | $400.00 | 1-in-3,000 | 10770 |
| 6th | $150.00 | 1-in-2,000 | 16113 |
| 7th | $100.00 | 1-in-296 | 108899 |
| 8th | $50.00 | 1-in-462 | 69850 |
| 9th | $40.00 | 1-in-176 | 182785 |
| 10th | $25.00 | 1-in-120 | 268928 |
| 11th | $20.00 | 1-in-60 | 537610 |
| 12th | $10.00 | 1-in-10 | 3225660 |
| 13th | $5.00 | 1-in-10 | 3225660 |

Overall Odds: 1-in-4.22

*Fig. 2*

SYSTEM AND METHOD FOR CASHLESS REDEMPTION OF LOTTERY TICKETS AND INCENTIVES FOR PLAYERS TO SPEND LOTTERY WINNINGS AT SPECIFIED THIRD-PARTY RETAIL VENDORS

FIELD OF THE INVENTION

The present invention relates to a ticket-based lottery game with cashless redemption and payout for winning lottery tickets that incentivizes players to visit and spend lottery winnings at third-party retail vendors identified on the lottery tickets.

BACKGROUND

Lottery games have become a time honored method of raising revenue for state and federal governments the world over. The success of these games, however, depends on continuous innovations that capture the interests of current players, draw new players to the games, and motivate third-party vendors and retail establishments to sell lottery tickets.

As with other consumers, lottery players are becoming more tech savvy and are interested in conducting various gaming aspects via electronic devices, such as smart phones or other smart electronic devices. The gaming industry is appreciative of this fact and is seeking ways to integrate games and gaming-related functions into the rapidly developing mobile electronic communication age.

With conventional systems and methods, authorized retail vendors within a lottery jurisdiction have been the primary means of lottery ticket sales and distribution. This relationship has been beneficial to the vendors in that lottery players also tend to purchase additional goods in the retail establishment. The gaming authority (e.g., a state or other governmental lottery authority) also benefits in that a wide and varied sales and distribution network is provided by the authorized retail establishments.

It is important that new innovations in the gaming industry, particularly with respect to electronic gaming via smart phones or other portable mobile devices, preserve or enhance this mutually beneficial relationship. This is of particular concern to the retail vendors as electronic and on-line lottery ticket sales are growing in acceptance and popularity and could potentially decrease lottery player traffic to the retail establishments.

It would also be beneficial to the lottery industry if non-traditional third-party vendors would actively participate as partners or sponsors with the lottery providers even if lottery tickets were not sold in the third-party retail establishments.

The lottery industry is thus continuously seeking new and creative gaming scenarios that provide increased entertainment value to players, entice new players, and expand play of lottery games into the smart electronic communication age while at the same time maintaining or increasing lottery player foot traffic to the conventional ticket sales retail establishments and enticing non-traditional third-party vendors to sponsor or otherwise partner with lottery providers.

In addition, with conventional systems and methods, authorized retail vendors within a lottery jurisdiction have been the primary means of lottery ticket sales and redemption of cash prizes for winning lottery tickets up to a certain amount. Prizes in excess of this amount typically must be redeemed at a lottery redemption center.

An ongoing issue with the conventional payout systems and methods is that lottery retailers commonly struggle to maintain on-hand cash sufficient to pay winners. When this occurs, the retailer has no other option than to turn the player away, resulting in the player visiting a different retailer for their payout. This situation results in the loss of potentially valuable foot traffic and additional purchases to the original retailer.

Also, with the conventional in-store cash redemption systems/methods, the lottery jurisdictions and lottery providers have little or no opportunity to influence downstream spending of the lottery proceeds by the player.

It would thus be beneficial to the lottery industry to develop a redemption system and method that alleviates the burden for retailers to maintain sufficient cash on hand for lottery ticket payouts, would encourage foot traffic and additional spending by players at the retailers, and would enable the lottery jurisdiction and/or lottery provider to influence or encourage spending of lottery proceeds at the retailers or other third parties partnered with the lottery jurisdiction.

SUMMARY OF THE INVENTION

Objects and advantages of the invention will be set forth in part in the following description, or may be obvious from the description, or may be learned through practice of the invention.

In particular embodiments, a system and method are provided for play of a lottery game wherein redemption of winning lottery tickets is accomplished in a cashless manner and players are encouraged to visit and spend winnings from the lottery game at a third-party vendor establishment. Lottery tickets are made available to players for play of a lottery game having a common prize structure, the lottery tickets having indicia thereon that identifies one of a plurality of third-party vendors. For example, the third-party vendors may include multiple big-box retail establishments, online shopping networks, online travel or rental sites, retail establishments that also sell lottery tickets, and so forth. It should be appreciated that the invention is not limited to a type or scope of third-party vendors or establishments.

The system and method enable the players to present one or more winning lottery tickets in the lottery game for redemption of a cash prize. A virtual debit card is then issued to the player and is loaded with a value equal to the cash prize from the one or more winning lottery tickets. The player may purchase goods or services charged against the virtual debit card up to the value of the virtual debit card.

The player is provided with instructions to visit and spend the cash prize loaded on the virtual debit card at the third-party vendor establishment identified on the winning lottery ticket(s).

The system and method also include offering an incentive to the players to purchase goods or services from the third-party vendors using the virtual debit card, the incentive having a value (e.g., a cash value) proportional to an amount charged against the virtual debit card at the third-party vendor establishment.

In a particular embodiment, the lottery tickets are printed or virtual scratch-off lottery tickets. The lottery tickets may also be instant-pay (fast-play) tickets or drawn-game tickets.

In certain embodiments, the player may present multiple winning lottery tickets for redemption at the same time, wherein the virtual debit card has a value equal to a total of the prizes assigned to the multiple winning lottery tickets.

Embodiments of the method and system may include providing a personalized digital account for the player that indicates a running balance of an amount remaining on the virtual debit card. The virtual debit card may be sponsored by a third-party financial services provider (e.g., a provider of Mastercard™ or Visa™ debit cards) and the personalized digital account may be enabled by a mobile application provided by a lottery provider, wherein the mobile application is linked to the third-party financial services provider.

The system and method may be configured such that, upon the player purchasing goods or services at the third-party vendor establishment using the virtual credit card, the financial services provider reports the purchase amount and identity of the third-party vendor to the lottery provider to update the player digital account with the purchase amount and identity of the third-party vendor. The incentive provided to the player may have a cash value proportional to the purchase amount at the third-party vendor establishment, wherein the cash value is credited to a wallet in the player digital account.

The mobile application may be configured to generate a lottery-specific code that is linked to the virtual debit card, wherein this lottery-specific code enables the player to purchase additional lottery tickets that are charged directly against the virtual debit card by presenting the lottery-specific code at time of purchase of the additional lottery tickets. The player may be provided with an award for using the mobile application and the code to purchase the additional lottery products. For example, the player may be awarded points in a loyalty program for purchasing the additional lottery tickets.

BRIEF DESCRIPTION OF THE DRAWINGS

A full and enabling description of the present invention is provided herein, with reference to particular embodiments depicted in the attached drawings and described below:

FIG. 2 is a table representing a common prize structure in a primary lottery ticket game;

DETAILED DESCRIPTION

Figure 1A:
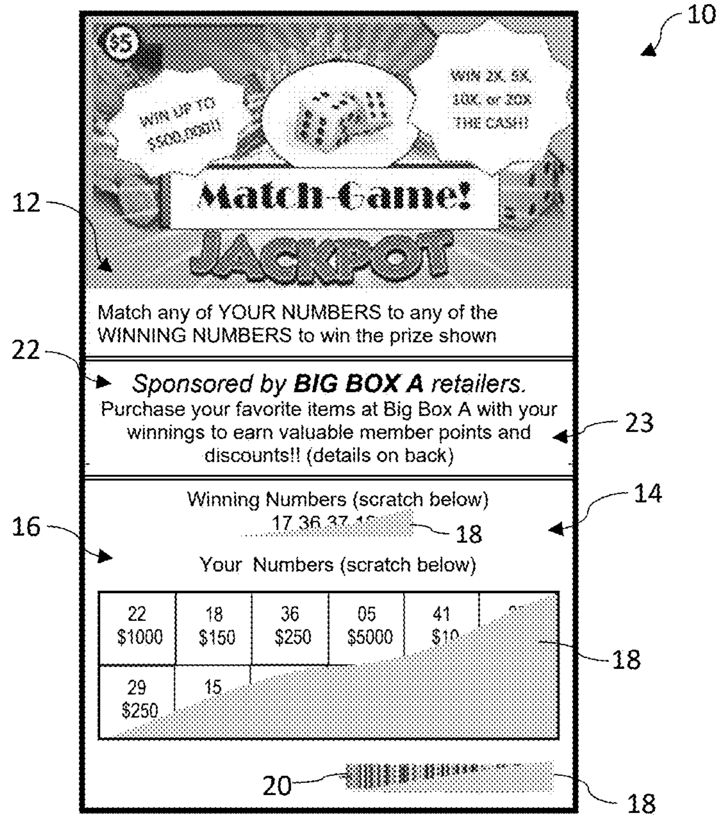
FIG. 1A depicts an example of a lottery ticket, specifically a scratch-off lottery ticket, configured for play in the system and method of the present invention.

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these, and other modifications and variations as come within the scope and spirit of the invention.

For sake of example only, the following discussion relates to embodiments of the invention drawn to lottery games, including primary games, bonus games, and second chance games sponsored by state or other jurisdictional lottery authorities and implemented by a third-party lottery provider wherein cash prizes are awarded in the games. It should be appreciated, however, that the system and method are just as applicable to gaming activities linked to any manner of other gaming authority, such as games conducted within a gaming establishment (e.g., a casino) for patrons of such establishment, or electronic games conducted via an electronic network, such as the internet, for authorized players.

The present disclosure makes reference to scratch-off lottery tickets for purposes of explaining aspects of the invention. It should be appreciated, however, that the invention is not limited to scratch-off lottery tickets. The game system and method presented herein may be played with any manner of paper or electronic lottery tickets (e.g., quick-pick or draw tickets). The tickets may be printed paper tickets, or may be electronically simulated tickets that are transmitted to and played by the player via an application running on a smart device, such as a mobile phone, tablet, computer, etc.

The system and method of the present invention may include a partnership between the lottery jurisdiction and a lottery party, as described below. The lottery provider is generally understood to be a party that manages and implements the lottery game for a specific jurisdiction (e.g., a state or other government entity). An example of a lottery provider is Scientific Games having a principal place of business in Alpharetta, GA, USA. The lottery provider supplies the lottery tickets 10 for play of the game 56 and implements the various functionalities and lottery machines or devices discussed herein as part of its services for the jurisdiction.

Embodiments of the method and system may also include a partnership between the lottery jurisdiction and/or lottery provider and a third-party financial services provider (e.g., Galileo Financial Technologies) that sponsors or otherwise provides the virtual debit cards described herein and interfaces with the lottery provider to carry out and account for the various charges made against the card and reported on the player's digital lottery account. The third-party financial services provider may provide card services including payment processing, and may be connected with payment networks (e.g., Visa™, Mastercard™) and contracted with banking institutions in order to create card products, process transactions, hold funds (bank), keep transaction data, and provide reporting.

FIG. 1A depicts a scratch-off lottery ticket 10 having a game play area 14 wherein variable game play indicia 16 is provided and covered by a scratch-off coating (SOC) layer 18. In order to reveal the winning or losing status of the ticket 10, the player removes the SOC layer 18 to uncover the underlying game play indicia 16. Thus, the game play indicia 16 is "variable" indicia in that it changes from one ticket 10 to another. In the depicted game, the ticket 10 presents a series of "Winning Numbers" in the game play area 14 covered by the SOC layer 18. A matrix of "Your Numbers" is provided below the "Winning Numbers" in the game player area 14.

The ticket 10 includes game instruction graphics and indicia 12 printed thereon that explain to a player how to play the game embodied on the ticket 10, as well as what constitutes a winning ticket and the prize amounts. The game instruction indicia 12 may be considered as "static" indicia in that, for a given common game, it does not change from one ticket 10 to the other. In FIG. 1A, the instructions 12 convey to the player that a match of any of the "Your Numbers" with any of the "Winning Numbers" wins the prize show below the number, as well as other prize multipliers.

Figure 4:
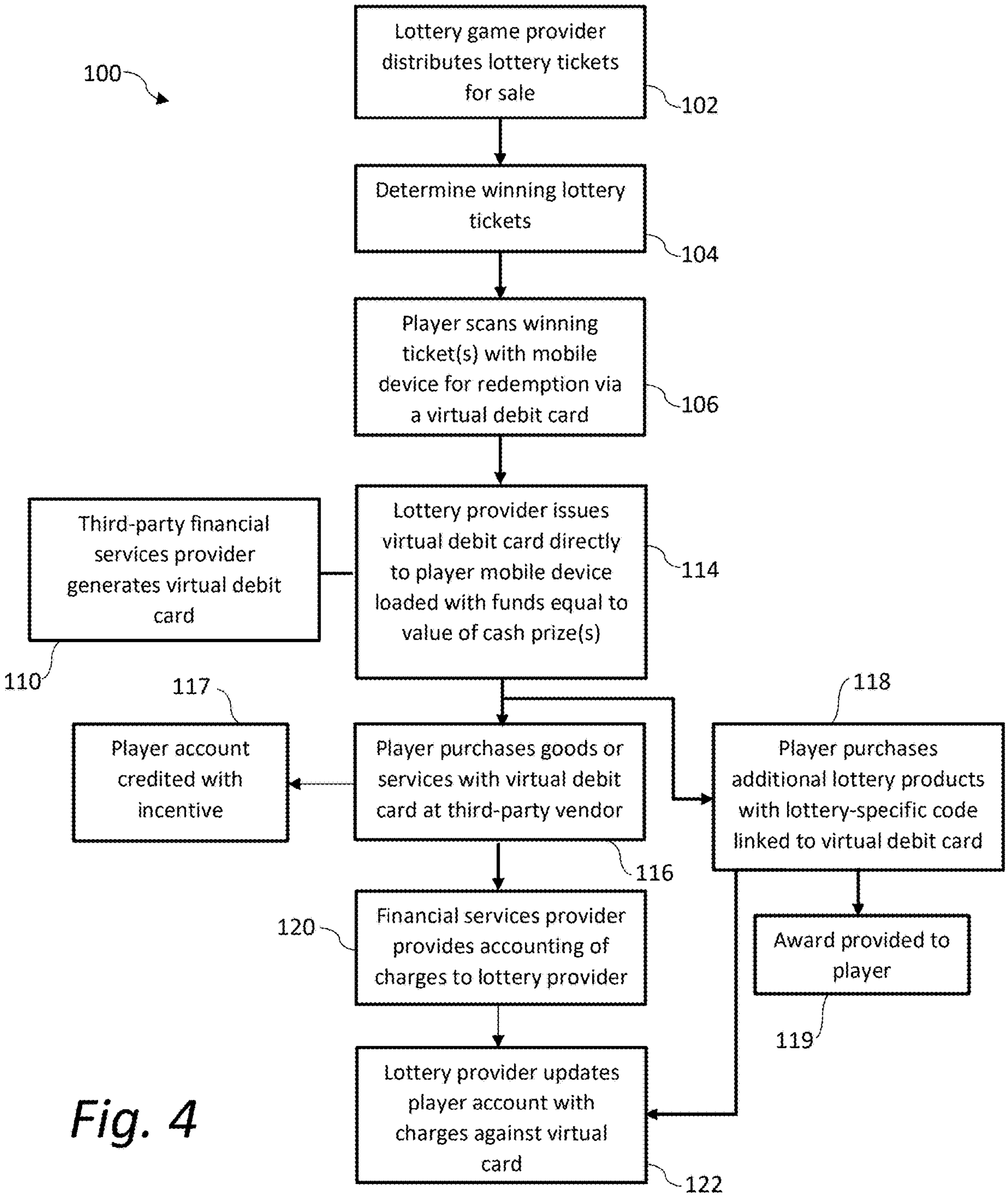
FIG. 4 is a flow chart of a different method embodiment in accordance with aspects of the invention.

Each lottery ticket 10 may include a validation code 20 printed thereon, which may also be covered by a SOC layer 18, that links the ticket 10 to a validation file contained in a central server or computer system maintained by a lottery provider 53 (FIG. 4). Those skilled in the art appreciate that the validation file contains ticket-specific information for validation and pay-out (redemption) of the ticket 10, including whether or not the ticket 10 qualifies for a bonus or second chance game. When the tickets 10 are presented to a physical redemption center/location 44 for validation and redemption of the prize, a scanner can be used to read the code 20 for verifying (via the ticket-specific information contained in the respective validation file) whether the ticket 10 is a winning ticket and the prize associated with the ticket 10.

As explained in greater detail below, aspects of the present method and system include a partnership or relationship with third-party vendors. For example, the third party vendors may include multiple big-box retail establishments, online shopping networks, online travel or rental sites, restaurants, retail establishments that also sell lottery tickets, and so forth. It should be appreciated that the invention is not limited to a type or scope of third party vendors or establishments. Each of the lottery tickets 10 used in the system and method identify at least one of these third-party inventors associated with the ticket 10. For example, the ticket 10 in FIG. 1A includes indicia 22 that identifies the third-party vendor as "Big Box A" retailer. The ticket 10 also includes instruction indicia 23 that conveys to the player that there is an opportunity to earn an incentive (having an identified value) if the player spends any winnings in the primary lottery game embodied by the ticket 10 at the vendor (explained below).

Figure 1B:
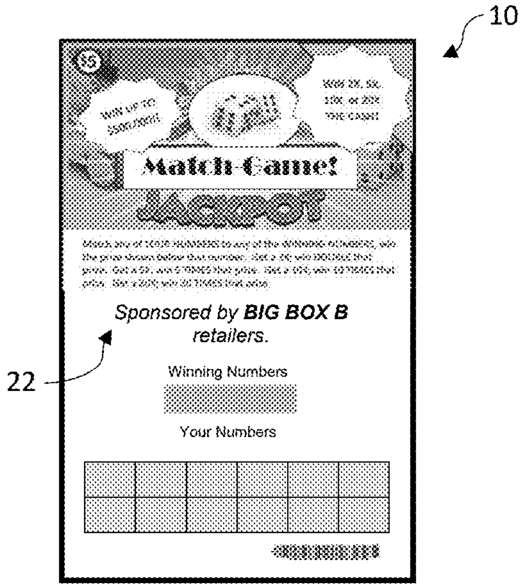
FIGS. 1B-1C depict examples of lottery tickets similar to FIG. 1A with each ticket identifying a different third party vendor.

The ticket 10 of FIG. 1B is similar to FIG. 1A except that the indicia 22 identifies the vendor as "Big Box B" retailers. Likewise, the ticket 10 in FIG. 1C identifies the vendor as "Restaurant C".

Figure 1C:
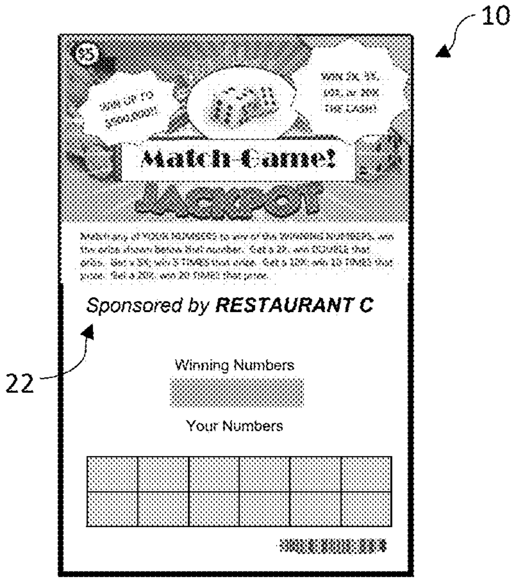

The tickets 10 in FIGS. 1A-1C embody a system and method wherein the player is encouraged to spend the winnings in the primary lottery game embodied by the tickets 10 at the associated third-party vendor.

The table in FIG. 2 depicts an example of a common prize structure 58 for a primary game 56 associated with the scratch-off lottery tickets 10 discussed above. A single multi-tier prize structure 58 is established for the game that includes at least one top tier prize 26 and a plurality of lower-tier prize levels 28. In the depicted embodiment, there are fourteen (14) top tier prizes 28 of $1,000,000 each (for fourteen winning tickets) and multiple prizes (for winning tickets) for each of the lower tier prize levels 28.

Figure 3:
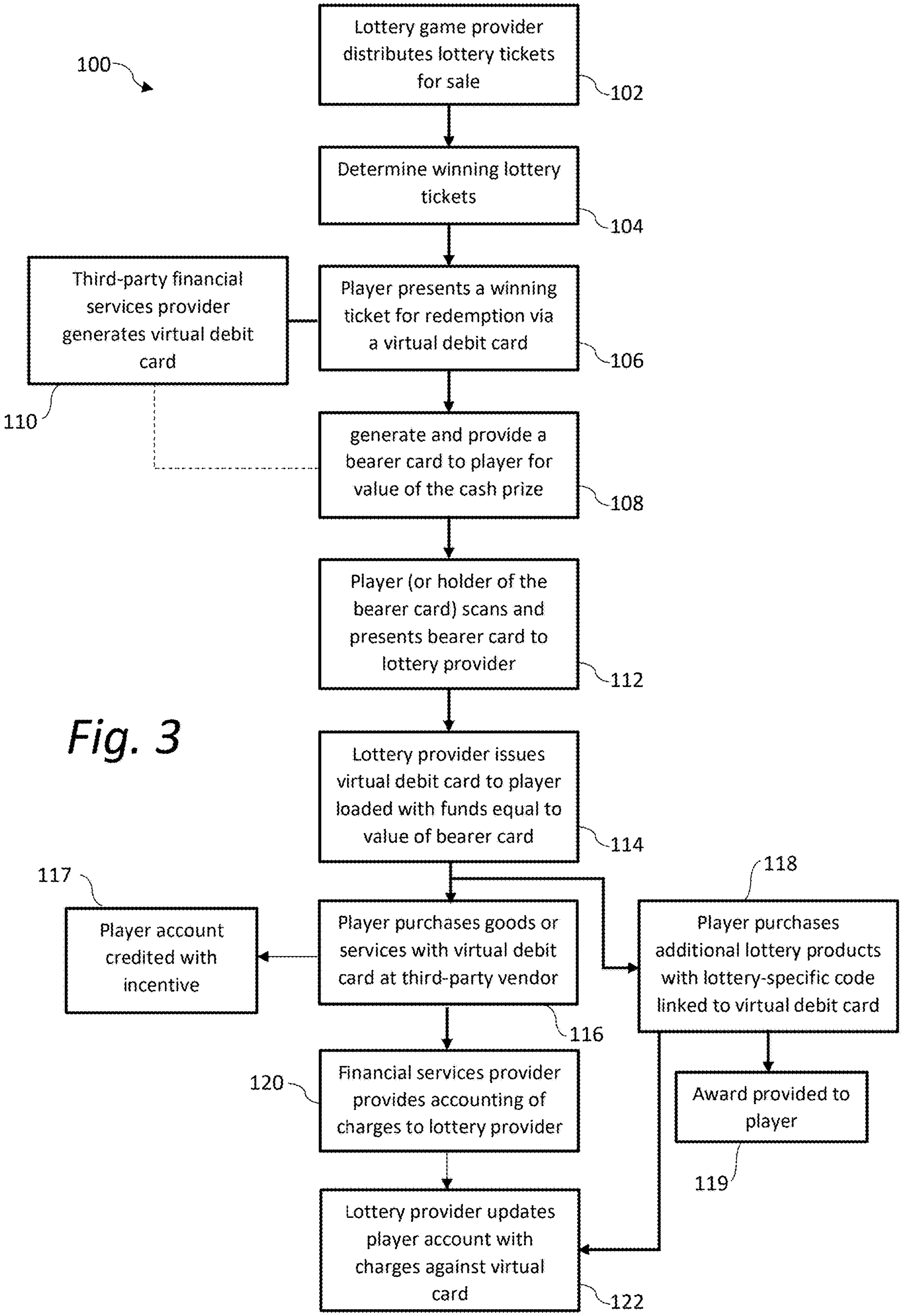
FIG. 3 is a flow chart of a method embodiment in accordance with aspects of the invention.

FIG. 3 is a diagram of system and method embodiments 100 for redemption of lottery tickets by players in a lottery game. The system and method 100 enable a player to present a winning lottery ticket 10 (FIG. 1A) in the lottery game for redemption of a cash prize. In step 102, the lottery game provider (in partnership with a lottery jurisdiction) distributes the lottery tickets 10 for sale via any conventional means and locations. For example, the tickets 10 may be sold to players at authorized retail locations by a store clerk. In an alternate embodiment, a self-service lottery ticket kiosk 50 (depicted in FIG. 5) may be located at an authorized location and provides a system wherein players can interact directly with the kiosk 50 to purchase various types of lottery tickets 10. In yet another embodiment, digital lottery tickets 10 may be made available for purchase to players via a lottery website and downloaded directly to a player's smart mobile device (e.g., a smart phone, tablet) or computer.

Step 104 indicates that winning lottery tickets 10 in the game are determined by established rules/procedures. For example, the scratch-off ticket 10 depicted in FIG. 1 indicates that the ticket 10 is a winning ticket ("36" is a matching winning number) with a cash value of $250.00. Other types of tickets 10 (e.g., draw or fast-play games) will have their respective procedures and rules for determining winning tickets 10.

At step 106, the player presents the winning lottery ticket 10 for redemption. This may be accomplished in various ways. For higher cash prizes, the player may be instructed to visit a lottery redemption center. The method and system 100 in FIG. 3 relates to an embodiment wherein the player presents the winning ticket 10 at an authorized retail location. For scratch-off lottery tickets 10, the validation code 20 will be scanned at time of redemption by the retail clerk and is used by the lottery provider to determine if the ticket is a genuine winning ticket, as is understood in the industry. In an alternate embodiment wherein the kiosk 50 is provided, the player may scan the validation code 20 directly at the kiosk 50.

FIG. 3 also relates to an embodiment wherein a "bearer card" is presented to the player, which is then used by the player to obtain a virtual debit card. It should be appreciated that the bearer card is not required in all embodiments of the method/system 100.

Step 108 indicates that a bearer card 52 (FIG. 5) may be created by the lottery provider at the time of redemption of the winning lottery ticket and provided to the player. The bearer card 52 has a value equal to the cash prize assigned to the winning lottery ticket 10. If multiple winning tickets are presented for redemption at the same time, the bearer card 52 may have a value equal to the total cash prize from all of the winning lottery tickets 10. For example, in FIG. 3, the bearer card 52 has a value of $250 The card 52 is considered a "bearer card" in that it has a face value for the holder of the card 52. For example, the player may decide to transfer the bearer card 52 to a third-party (e.g., a family member or friend), wherein the third-party can present the bearer card 52 for issuance of the virtual debit card 54 (FIG. 10) to the third-party (discussed below).

Figure 5:
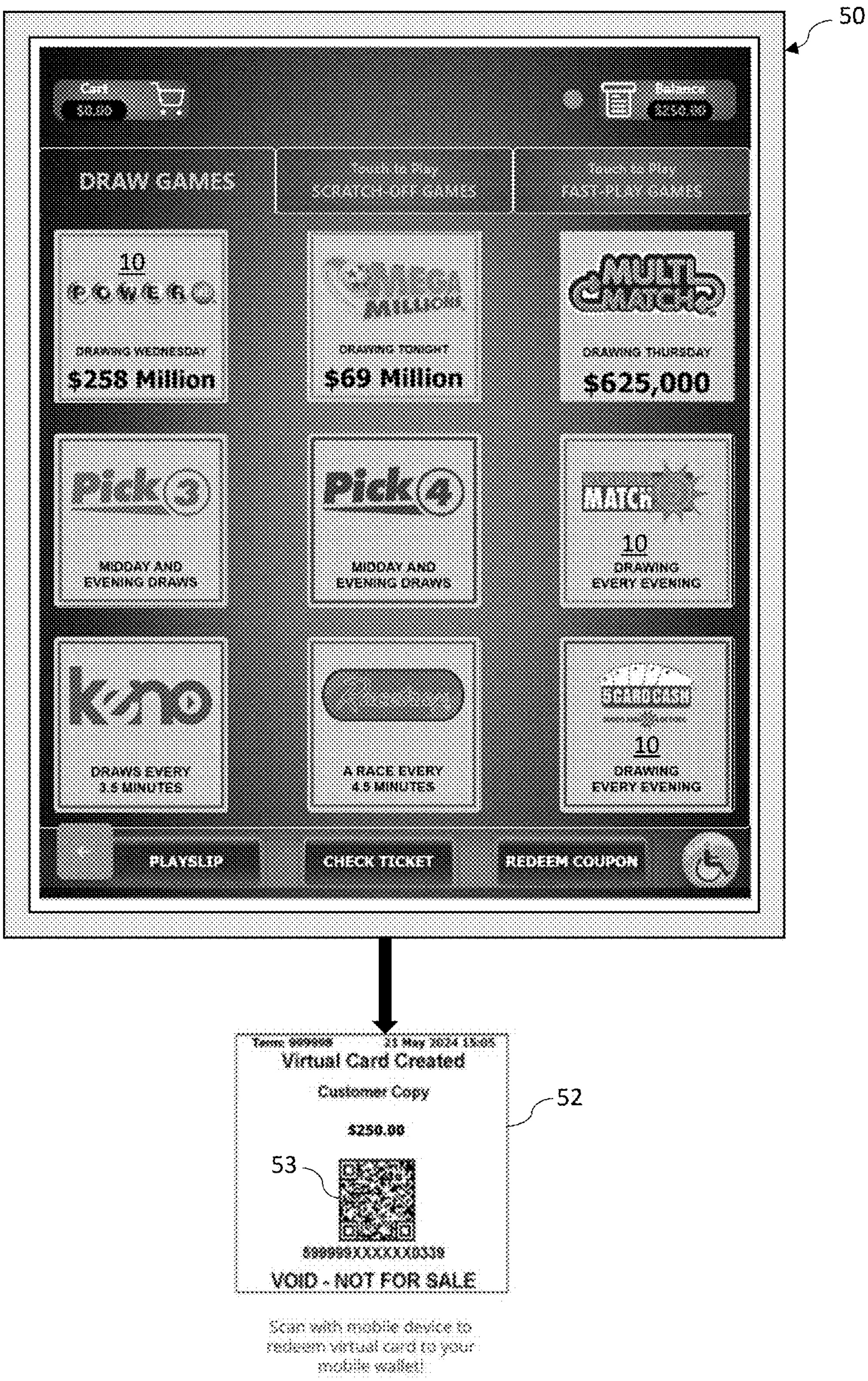
FIG. 5 depicts a ticket kiosk and issuance of a virtual bearer card.

As depicted in FIG. 5, the bearer card 52 may be a printed bearer card having a code 53 thereon, such as a QR code, bar code, or other type of scannable code.

Step 110 indicates creation of the virtual debit card 54 by the third-party financial services provider (discussed above) partnered with the lottery provider and lottery jurisdiction, which may take place when the player presents the winning ticket for redemption at step 106. The virtual debit card 54 may be generated before the bearer card 52 is printed, for example at step 106 (indicated by the dashed line). Upon creation, the virtual debit card 54 is loaded with funds equal to the value of the bearer card 52.

At step 112, the player (or other holder of the bearer card 52) presents the bearer card 52 to the lottery provider for redemption and receipt of a virtual debit card 54 loaded with the cash value indicated on the bearer card 52 (step 108). The code 53 on the bearer card 52 is scanned to validate the card 52. For example, the player may scan the code 53 using their mobile device.

At step 114, the lottery provider issues the virtual debit card 54 to the player. For example, the mobile device may be directed to a page that provides instructions to the player to download the virtual debit card 54 to a wallet in their mobile smart device.

At step 116, the player may purchase goods or services using the virtual debit card 54 (up to the value of the card 54) in the same manner as any other debit or credit card stored on their mobile smart device. The player may be encouraged (through incentives), however, to use the virtual debit card 54 at one or more of the sponsor vendors indicated on the lottery tickets 10 in FIGS. 1A-1C. For example, the player may visit a big box establishment for vendors A, B (FIGS. 1A-1B), a restaurant establishment for vendor C (FIG. 1C), a website maintained by a retail vendor establishment, and so forth, to spend the funds credited to the virtual debit card 54.

The incentives offered to the player for using the virtual debit card 54 at one of the sponsor third-party vendors may have a value (e.g., a cash value) proportional to an amount charged against the virtual debit card at the third-party vendor establishment. This cash value may be added to a digital wallet in the player's personal account. Other incentives may include increased points in a loyalty program, discounts or coupons at various vendors, and virtually anything having value that may incentivize players to purchase goods or services from the third-party vendors using the virtual debit cards 54 at the third-party vendors.

Step 117 indicates that the player's personal digital account is eventually credited with the incentive by the lottery provider (i.e., after an accounting of the charges against the virtual debit card has been transferred by the third-party financial services provider to the lottery provider).

Step 118 indicates that the player may also use the funds loaded on the virtual debit 54 to purchase additional lottery products (e.g., additional lottery tickets via a kiosk 50) through a lottery-sponsored personalized digital account, as explained in greater detail below. An award or additional incentive may be offered to the player at step 119 for the purchase of such lottery products.

At step 120, the financial services provider provides an accounting to the lottery provider of the various (all) charges posted against the player's virtual debit card 54, which includes the identity of any of the third-party vendors. At step 122, the lottery provider updates the player's personal digital account with the charges and the charges for additional lottery products (step 118) and maintains a running total of the amount remaining on the virtual debit card.

FIG. 4 is a diagram of an alternate embodiment of the method/system 100 wherein, instead of the player presenting their winning lottery ticket 10 to a retail location or kiosk, the player scans the winning ticket 10 (at step 106) with their mobile smart device. At step 110, the third-party financial services provider generates the virtual debit card subsequent to scanning of the winning ticket by the player, and at step 114 the lottery provider issues the virtual debit card directly to the player mobile device loaded with the funds equal to the cash prize value of the winning ticket(s).

The embodiment of FIG. 4 does not use the bearer card discussed above with respect to FIG. 3. The remaining steps in FIG. 4 are the same as discussed with respect to FIG. 3.

Referring to FIGS. 6 through 13, embodiments of the method and system 100 may be enabled via a player's smart device 56, such as a mobile phone, tablet, and so forth. The depicted embodiment relates to the "bearer card" embodiment of FIG. 3.

Figure 6:
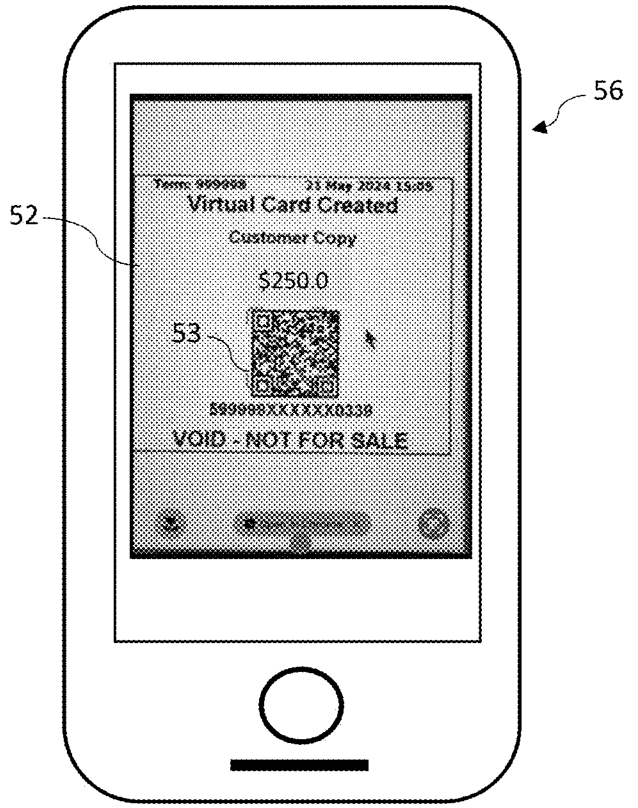
FIG. 6 depicts a virtual bearer card loaded onto a mobile smart device.

FIG. 6 depicts a screen shot from the player's mobile smart device 56 of the bearer card 52 discussed above after the player scanned the paper copy of the bearer card 52.

Figure 7:
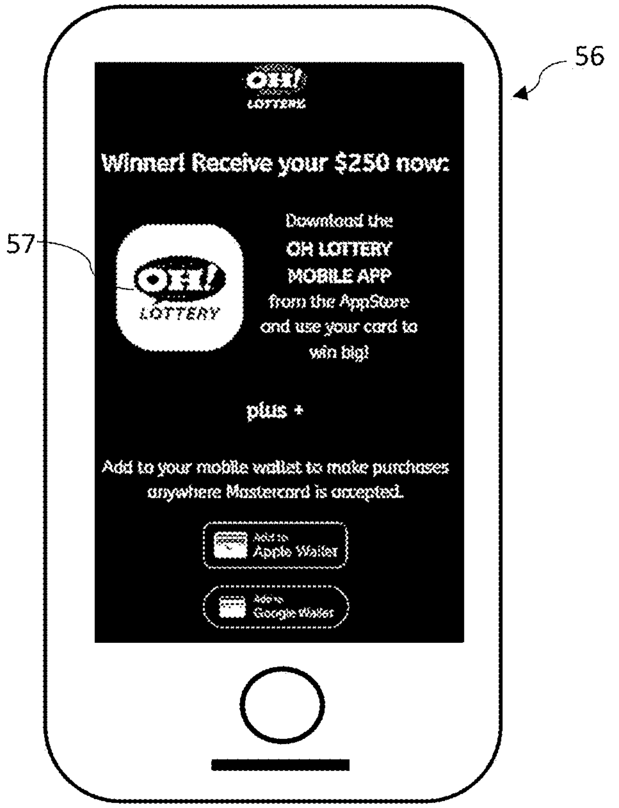
FIG. 7 depicts a link to a state-sponsored mobile lottery app after the player has scanned the virtual bear card or scanned the winning lottery ticket with the mobile smart device.

Referring to FIG. 7, by highlighting and entering the code 53, the player is given the choice to download or be directed to a lottery-sponsored mobile app site 57 where the player is prompted to add the virtual debit card for $250 directly to their lottery app wallet, or to simply add the virtual debit card 54 directly to one of the listed mobile wallets (e.g., Apple Wallet or Google Wallet). The lottery-sponsored mobile app 57 may provide additional options or features linked to the virtual debit card such as balance, transaction history, and loyalty rewards.

Figure 8:
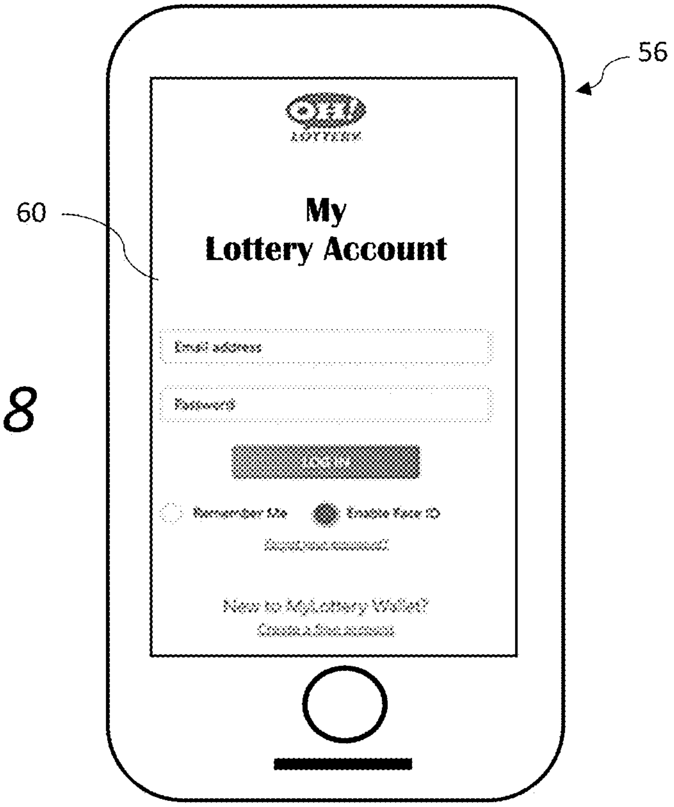
FIGS. 8 and 9 depict steps for linking the virtual bearer card and/or the virtual debit card to the mobile app.

FIG. 8 depicts that the player has downloaded the mobile app and is given instructions 60 to log in to their personalized digital account or to set up such an account.

Figure 9:
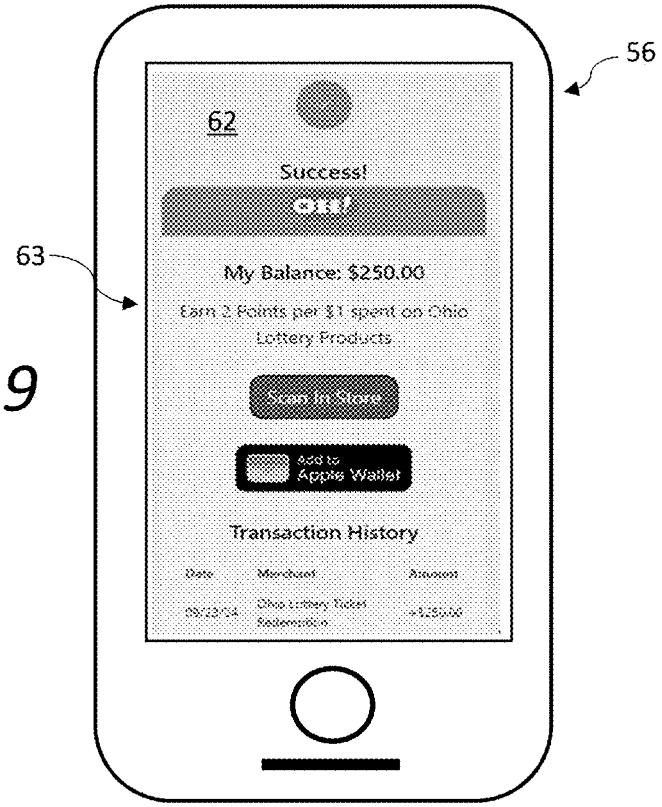

The screenshot in FIG. 9 indicates that the value ($250) of the virtual debit card has been added to the player's virtual debit card library in the personal account 62. The library may include an accounting for multiple virtual debit cards. An entry at the bottom of the screen indicates that the account was credited with the virtual debit card issued for redemption of the lottery ticket. The player is also given the option to add the virtual debit card to their digital wallet if not previously done. An additional option ("scan in store") is also provided wherein the player can purchase additional lottery products with the funds in the balance. An incentive 63 is offered for these additional lottery products. For example, the player is offered "2 points" in their account for each $1 spent on the additional lottery products. These points may be credited, e.g., to a loyalty program or other award program wherein the points may eventually be used to purchase goods or services from the lottery or another party. The incentive 63 may take on any form that entices players to purchase additional lottery products, such as a monetary award, points in an award program, discounts at vendor establishments, and so forth. The incentives 63 also tend to drive players to the retail establishments that sell lottery tickets, which is a valuable consideration for the retail establishments.

Figure 10:
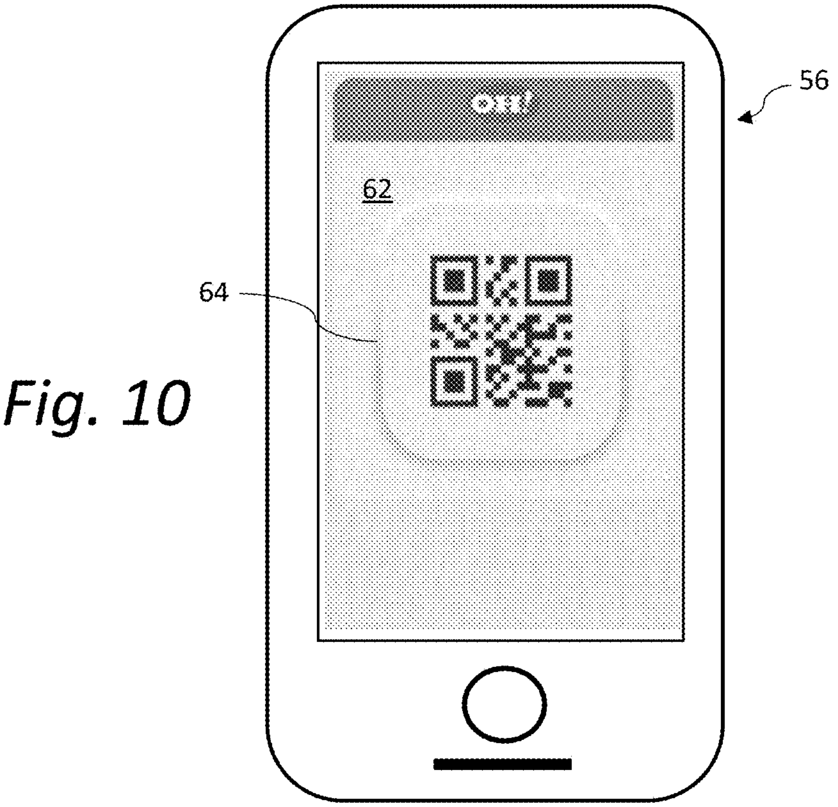
FIG. 10 depicts generation of a lottery-specific code from the mobile app for purchase of additional lottery products charged against the virtual debit card.

FIG. 10 depicts that the player has selected the "scan in store" option and a lottery-specific code 64 has been generated and displayed on the smart device 56. The code 64 is linked to the virtual debit card 54. The player can purchase the additional lottery products by presenting the code for scanning by a retail clerk or at a self-serve kiosk 50.

Figure 11:
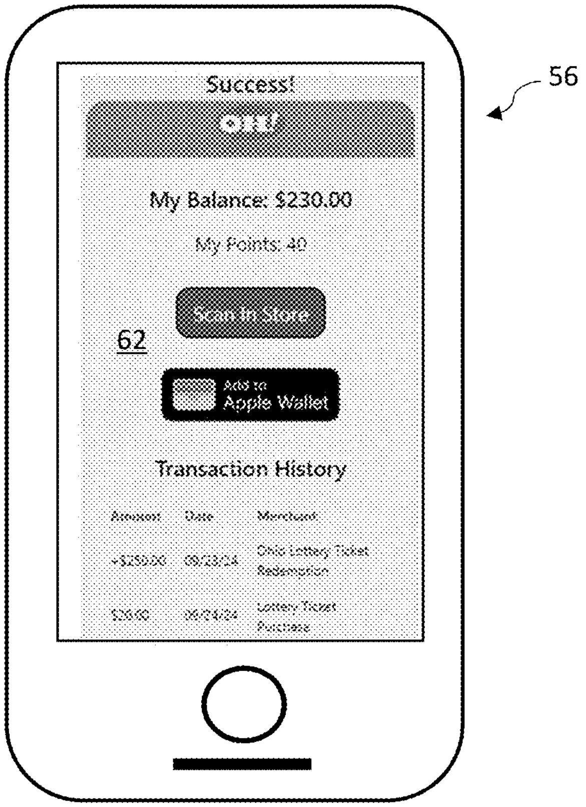
FIG. 11 depicts an accounting of the additional lottery products against the balance of the virtual debit card.

FIG. 11 depicts that the player purchased $20 worth of additional lottery products, as referenced by the accounting entry at the bottom of the screen. The $20 charge against the virtual debit card 54 was transmitted by the third-party financial services provider to the lottery provider in order to update the player's account balance.

Figure 12:
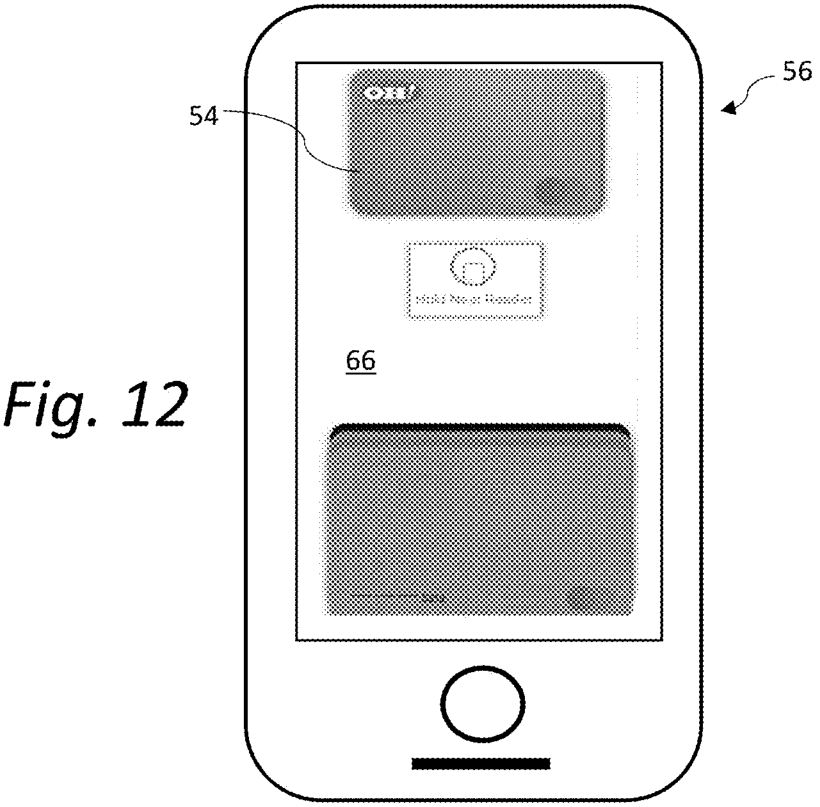
FIG. 12 depicts instructions on the mobile smart device for the player to make purchases of third-party goods or services using the virtual debit card.

FIG. 12 depicts the player's digital wallet with the virtual debit card 54 stored therein. It should be appreciated that the player may use the virtual debit card 54 for the purchase of any type of goods or services, including the purchase of additional lottery products by bypassing the personal account 62. However, purchases of additional lottery products directly from the wallet 66 will not be credited with the incentive points. The purchases of goods or services directly from the wallet 66 will be reflected in the balance and accounting entries of the player's personalized digital account 62, as reflected in FIG. 13.

Figure 13:
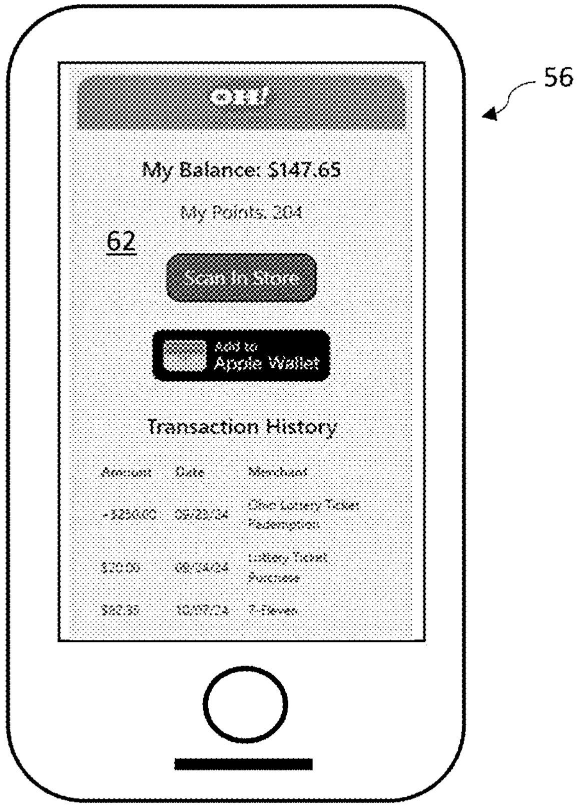
FIG. 13 depicts an accounting of the additional goods or services against the balance of the virtual debit card.

Purchases from the sponsor third-party vendors (FIGS. 1A-1C) will also be reflected in the accounting entries posted to the player's personalized digital account 62, as reflected in FIG. 13. The incentives awarded to the player for these purchases will also be posted in, for example, a separate wallet within the player's account.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method for play of a lottery game that encourages a player to visit and spend winnings from the lottery game at a third-party vendor establishment, the method comprising:

providing lottery tickets for play of a lottery game having a common prize structure, the lottery tickets having indicia thereon that identifies one of a plurality of third-party vendors;

enabling for a player to present a winning lottery ticket in the lottery game for redemption of a cash prize;

issuing a virtual debit card to the player, the virtual debit card loaded with a value equal to the cash prize, wherein the player can purchase goods or services charged against the virtual debit card up to the value of the virtual debit card;

providing instructions to the player to visit and spend the cash prize loaded on the virtual debit card at the third-party vendor establishment; and transferring an incentive to the player having a value proportional to an amount charged against the virtual debit card at the third-party vendor establishment.

2. The method according to claim 1, wherein the lottery tickets are scratch-off lottery tickets.

3. The method according to claim 1, wherein multiple winning lottery tickets are presented by the player for redemption at the same time, the virtual debit card loaded with a value equal to the cash prizes for all of the winning lottery tickets.

4. The method according to claim 1, comprising providing a personalized player digital account that indicates a running balance of an amount remaining on the virtual debit card.

5. The method according to claim 4, wherein the virtual debit card is sponsored by a third-party financial services provider and the player digital account is enabled by a mobile application provided by a lottery provider, the mobile application linked to the third-party financial services provider.

6. The method according to claim 5, wherein upon the player purchasing goods or services at the third-party vendor establishment using the virtual debit card, the financial services provider reports the purchase amount and identity of the third-party vendor to the lottery provider to update the player digital account with the purchase amount and identify of the third-party vendor.

7. The method according to claim 6, wherein the incentive provided to the player has a cash value proportional to the purchase amount at the third-party vendor establishment.

8. The method according to claim 7, wherein the cash value of the incentive is credited to a wallet in the player digital account.

9. The method according to claim 5, wherein the mobile application is configured to generate a code that is linked to the virtual debit card, the code enabling the player to purchase additional lottery products that are charged directly against the virtual debit card by presenting the code at time of purchase of the additional lottery products.

10. The method according to claim 9, wherein the player is provided with an award for using the mobile application and the code to purchase the additional lottery products.

11. A system for play of a lottery game that encourages a player to visit and spend winnings from the lottery game at a third-party vendor establishment, the system comprising:

a plurality of lottery tickets for play of the lottery game having a common prize structure, the lottery tickets comprising indicia thereon that identifies one of a plurality of third-party vendors, winning lottery tickets from the plurality of lottery tickets redeemable by the player for a cash prize;

a virtual debit card loaded with a value equal to the cash prize of one or more of the winning lottery tickets redeemed by the player;

wherein the player can purchase goods or services charged against the virtual debit card up to the value of the virtual debit card;

instructions provided to the player to visit and spend the cash prize loaded on the virtual debit card at the third-party vendor establishment; and an incentive provided to the player having a value proportional to an amount charged against the virtual debit card at the third-party vendor establishment.

12. The system according to claim 11, wherein the lottery tickets comprise scratch-off lottery tickets.

13. The system according to claim 11, comprising a personalized player digital account accessible by the player, the player account indicating a running balance of an amount remaining on the virtual debit card.

14. The system according to claim 13, wherein the virtual debit card is sponsored by a third-party financial services provider and the player digital account is enabled by a mobile application provided by a lottery provider, the mobile application linked to the third-party financial services provider, wherein upon the player purchasing goods or services at the third-party vendor establishment using the virtual credit card, the financial services provider reports the purchase amount and identity of the third-party vendor to the lottery provider to update the player digital account with the purchase amount and identify of the third-party vendor.

15. The system according to claim 14, wherein the incentive provided to the player comprises a cash value that is credited to a wallet in the player digital account.

16. The system according to claim 14, wherein the mobile application is configured to generate a code that is linked to the virtual debit card, the code enabling the player to purchase additional lottery products that are charged directly against the virtual debit card by presenting the code at time of purchase of the additional lottery products.

* * * * *